United States Patent [19]
Quere et al.

[11] Patent Number: 5,246,090
[45] Date of Patent: Sep. 21, 1993

[54] DRUM BRAKE AND WEAR ADJUSTER THEREFOR

[75] Inventors: Alain Quere, Clichy; Thierry Le Moigne, Villeneuve La Garenne, both of France

[73] Assignee: General Motors France, Gennevilliers, France

[21] Appl. No.: 878,711

[22] Filed: May 4, 1992

[30] Foreign Application Priority Data

Jun. 8, 1991 [GB] United Kingdom ............... 9112350

[51] Int. Cl.⁵ ............................................. F16D 65/66
[52] U.S. Cl. ............................. 188/79.52; 188/79.56; 192/111 A
[58] Field of Search ............. 188/79.52, 79.54, 79.56; 192/111 A

[56] References Cited

U.S. PATENT DOCUMENTS

| | | | |
|---|---|---|---|
| 2,101,425 | 12/1937 | Brisson | 188/79.52 |
| 3,983,970 | 10/1976 | Courbot | 188/79.52 |
| 4,390,086 | 6/1983 | Conrad | 188/79.5 B |
| 4,706,783 | 11/1987 | Rath et al. | 188/79.5 B |
| 4,729,457 | 3/1988 | Cousin et al. | 188/79.52 |
| 4,804,072 | 2/1989 | Michoux et al. | 192/111 A X |
| 4,809,826 | 3/1989 | Charbonnier | 188/79.52 |
| 4,938,320 | 7/1990 | Hyde et al. | 188/79.52 |

FOREIGN PATENT DOCUMENTS

| | | |
|---|---|---|
| 3100678A1 | 12/1981 | Fed. Rep. of Germany . |
| 1507550 | 4/1978 | United Kingdom ............. 188/79.52 |
| 2056599B | 4/1982 | United Kingdom . |
| 2088977B | 10/1985 | United Kingdom . |
| 2194300A | 8/1987 | United Kingdom . |

*Primary Examiner*—George E. A. Halvosa
*Attorney, Agent, or Firm*—Ernest E. Helms

[57] ABSTRACT

A drum brake comprising a drum; first and second brake shoes which carry friction lining material; at least one hydraulic actuator engaging the brake shoes for moving the friction lining material into contact with the drum on actuation thereof, a clearance existing between the friction lining material and the drum in the non-actuated position of the hydraulic actuator; a wear adjuster for adjusting the value of the clearance, the wear adjuster comprising a screw-threaded rod engaging the first brake shoe, a nut rotatably threaded on the screw-threaded rod and engaging the second brake shoe, ratchet teeth integrally formed on either the screw-threaded rod or the nut, an adjuster actuator having an integral pawl thereon and being pivotally mounted on one of the brake shoes, an actuator spring to bias the pawl into contact with the ratchet teeth; and a heat sensitive member mounted on said one brake shoe, the heat sensitive member being engageable with the adjuster actuator only when the temperature exceeds a predetermined level to prevent or restrict pivoting movement thereof. The wear adjuster adjusts the clearance value when it is above a predetermined maximum prior to actuation on actuation of the drum brake. The heat sensitive member prevents such adjustment when the temperature exceeds the predetermined level.

12 Claims, 7 Drawing Sheets

DRUM BRAKE AND WEAR ADJUSTER THEREFOR

This invention relates to a drum brake for a vehicle, and in particular to an automatic wear adjuster for a drum brake.

It has been known for many years to provide drum brakes with mechanisms for automatically adjusting the position of the brake shoes relative to the drum to allow for wear of the friction lining material on the break shoes. A continuing problem associated with such wear adjusters is that if the drum brakes become excessively hot, due, for example, to being actuated for a long period, then the various components of the drum brake may expand. This results in the clearance between the brake shoes and the drum to increase, giving a false indication of wear, thereby causing the wear adjuster to over adjust. In such circumstances, on cooling, the brake shoes may be left in contact with the drum. That is, no clearance exists between the brake shoes and the drum in the non-actuated or rest position. Arrangements are known for trying to overcome this problem, for example, as shown in GB Patent Application Nos. 2088977A and 2056599A. In these arrangements, the wear adjuster comprises a strut which includes a screw-threaded rod carrying a nut; ratchet teeth on the nut; and a pawl for rotating the nut when excessive wear has occurred. Heat actuated means are provided for preventing actuation of the nut when the drum brake becomes excessively hot. However, these known arrangements of heat actuated means are not always reliable. In these arrangements, the heat actuated means is an active part of the wear adjuster, and therefore requires to operate with great precision if not to effect the reliability of the wear adjuster.

It is an object of the present invention to overcome the above disadvantage.

To this end, a drum brake in accordance with the present invention comprises a drum; first and second brake shoes which are pivotally mounted at one end thereof and which carry friction lining material; at least one hydraulic actuator engaging the other end of the brake shoes for moving the friction lining material into contact with the drum on actuation thereof, a clearance existing between the friction lining material and the drum in the non-actuated position of the hydraulic actuator; a wear adjuster for adjusting the value of the clearance, the wear adjuster comprising a screw-threaded rod engaging the first brake shoe, a nut rotatably threaded on the screw-threaded rod and engaging the second brake shoe, ratchet teeth integrally formed on either the screw-threaded rod or the nut, an adjuster actuator having an integral pawl thereon and being pivotally mounted on one of the brake shoes, an actuator spring attached to the adjuster actuator to bias the pawl into contact with the ratchet teeth to rotate the nut relative to the screw-threaded rod in opposite directions on actuation and de-actuation respectively of the hydraulic actuator when the clearance value is below a predetermined maximum prior to actuation, but to prevent or restrict relative rotation on de-actuation of the hydraulic actuator when the clearance value is above the predetermined maximum prior to actuation to return the clearance value to below the predetermined maximum; and a heat sensitive member mounted on said one brake shoe, the heat sensitive member being engageable with the adjuster actuator only when the temperature exceeds a predetermined level to substantially prevent or restrict pivoting of the adjuster actuator, thereby rotating the nut relative to the screw-threaded rod in opposite directions on actuation and de-actuation respectively of the hydraulic actuator, irrespective of the clearance value prior to actuation.

The present invention is more reliable than previously known arrangements. Compared to the above mentioned prior art, the heat sensitive member is not an active part of the wear adjuster, and therefore does not effect the reliability thereof.

Preferably, the adjuster actuator comprises a first leg which extends into an aperture in the said one brake shoe from one side of the said one brake shoe; and the heat sensitive member is positioned on the opposite side of the said one brake shoe to the adjuster actuator and comprises a long arm and a short arm, the long arm being curved when the temperature is below the predetermined level and substantially straight when the temperature is above the predetermined level, the arrangement being such that the short arm moves into the aperture when the temperature is above the predetermined level to engage the first leg, thereby substantially preventing or restricting pivotal movement of the adjuster actuator relative to the said one brake shoe. Alternatively, the adjuster actuator may comprise a first leg which extends through an aperture in the said one brake shoe from one side of the said one brake shoe, the first leg having a notch in its projecting edge; and the heat sensitive member may be positioned on the opposite side of the said one brake shoe to the adjuster actuator and comprises an arm having a neck portion and an enlarged head portion at one end, the arm being curved when the temperature is below the predetermined level and substantially straight when the temperature is above the predetermined level, the arrangement being such that the neck portion moves into the notch when the temperature is above the predetermined level such that the first leg engages the enlarged head portion, thereby substantially preventing or restricting pivotal movement of the adjuster actuator relative to the said one brake shoe. In either of the above cases, the first leg preferably has a curved portion positioned in the aperture about which the adjuster actuator can pivot relative to the said one brake shoe.

As a further alternative, the adjuster actuator may comprise a first leg which extends substantially perpendicularly from one side of the said one brake shoe, the first leg having a notch in its projecting edge; and the heat sensitive member may be positioned on the same side of the said one brake shoe as the adjuster actuator and comprises an arm having a neck portion and an enlarged head portion at one end, the arm being curved when the temperature is below the predetermined level and substantially straight when the temperature is above the predetermined level, the arrangement being such that the neck portion moves into the notch when the temperature is above the predetermined level such that the first leg engages the enlarged head portion, thereby substantially preventing or restricting pivotal movement of the adjuster actuator relative to the said one brake shoe.

In the above alternative arrangements, the adjuster actuator preferably comprises a main body portion which is substantially planar, the pawl being positioned at one end thereof and the first leg extending away from the other end thereof at substantially 90 degrees thereto. In this case, the adjuster actuator preferably comprises a second leg positioned substantially mid-way between the pawl and the first leg and extending away from the main body portion at substantially 90 degrees thereto, the actuator spring being secured at one end to the second leg. Also, in this case, the other end of the actuator spring is preferably secured to the other brake shoe.

Preferably, the adjuster actuator is mounted on the first brake shoe.

The drum brake preferably comprises a single hydraulic actuator having two pistons, one piston acting on the first brake shoe, and the other piston acting on the second brake shoe. Alternatively, the drum brake may comprise two hydraulic actuators, one for each brake shoe.

Preferably, the nut comprises an internally threaded tube which is open at one end and closed at the other end, the screw-threaded rod being screw threaded into the open end of the tube, and the closed end engaging the second brake shoe; and the ratchet teeth are formed around the peripheral edge of an enlarged portion of the screw-threaded rod. Alternatively, a tube may be positioned between the nut and the second brake shoe, the nut being rotatable relative to the tube, the screw-threaded rod extending into the tube and being freely rotatable therein; and the ratchet teeth are formed around the peripheral edge of the nut.

The heat sensitive member is preferably a bi-metallic element composed, as is usual, of two strips of metal laid on top of one another, the two metals being different and having different expansion coefficients.

The present invention will now be described, by way of example, with reference to the accompanying drawings, in which.

Figure 1:
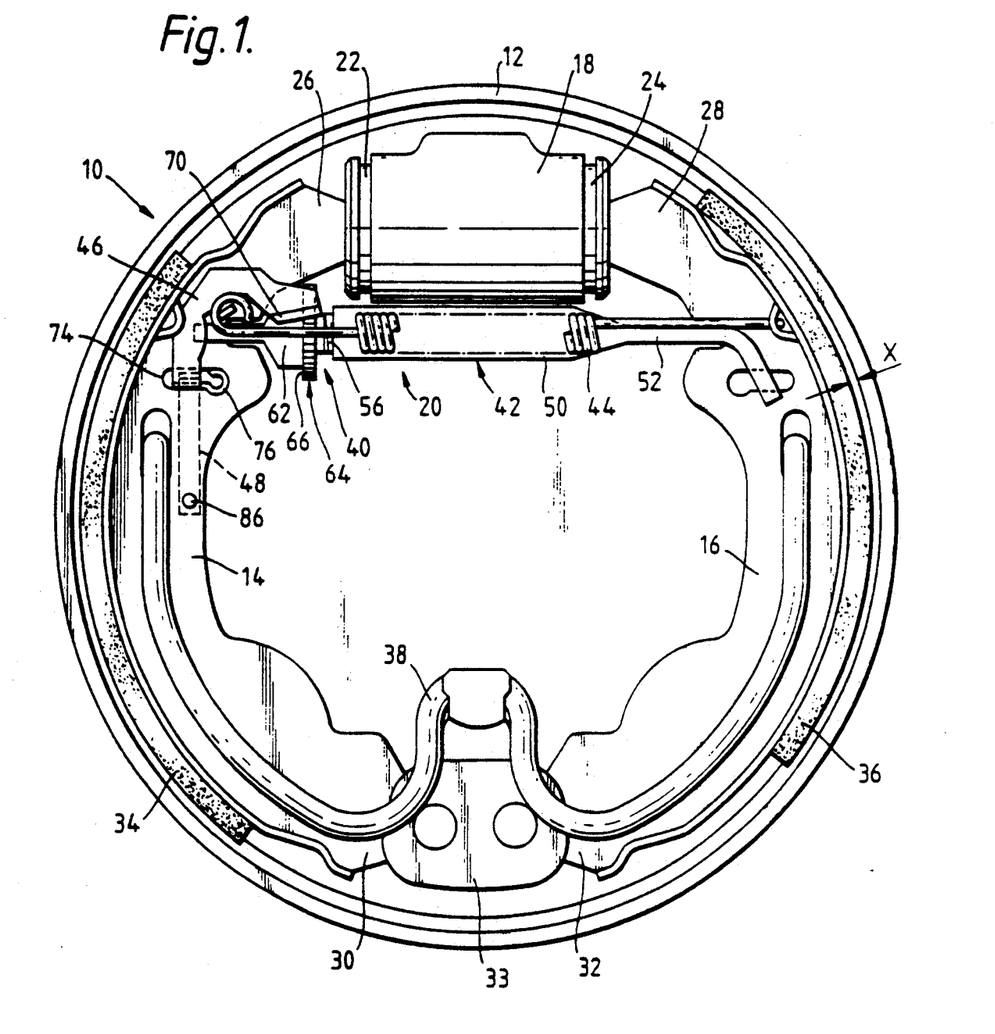
FIG. 1 is an elevational view, partly in cross-section, of a first embodiment drum brake in accordance with the present invention.

Referring to FIG. 1, a drum brake 10 in accordance with the present invention is shown which comprises a drum 12, first and second brake shoes 14,16 respectively, a hydraulic actuator 18, and a wear adjuster 20. The hydraulic actuator 18 is fluidly connected to the braking system of a motor vehicle (not shown) and comprises a pair of pistons 22,24. Each piston 22,24 engages one end 26,28 respectively of one of the brake shoes 14,16 respectively. Each brake shoe 14,16 is pivotally mounted at its other end 30,32 respectively in contact with an abutment 33. Friction lining material 34,36 is carried on each brake shoe 14,16 respectively. A shoe spring 38 retains the brake shoes 14,16 in engagement with the hydraulic actuator 18 and the abutment 33.

Figure 1A:
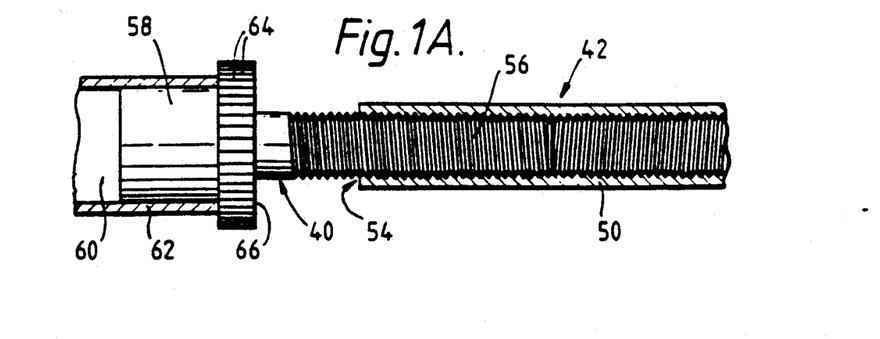
FIG. 1A is a cross-sectional view of the screw-threaded rod, nut, and socket member of the wear adjuster of the drum brake shown in FIG. 1.

The wear adjuster 20 comprises a screw-threaded rod 40, a nut 42, an actuator spring 44, an adjuster actuator 46 and a heat sensitive member 48. The nut 42 is in the form of a tube 50 which is internally threaded, which is closed at one end 52, and which is open at the other end 54. The closed end 52 engages the second brake shoe 16. The screw-threaded rod 40 has one end 56 screw threaded to the internal threads of the tube 50, and the other end 58 freely rotatable in a closed bore 60 is a socket member 62, as shown in greater detail in FIG. 1A. The socket member 62 engages the first brake shoe 14 and an enlarged diameter portion 66 of the screw-threaded rod 40, and provides engagement between the screw-threaded rod and the first brake shoe. Ratchet teeth 64 are formed around the peripheral edge of the enlarged diameter portion 66 of the screw-threaded rod 40.

Figure 2:
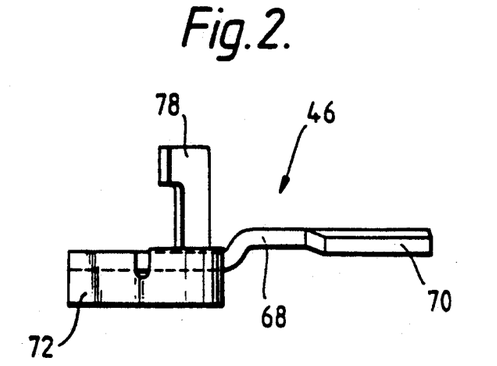
FIGS. 2 and 3 are side and top view respectively of the adjuster actuator of the wear adjuster of the drum brake shown in FIG. 1.
Figure 3:
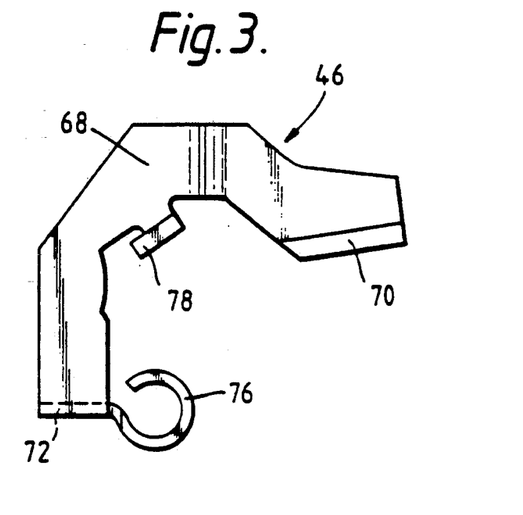

The adjuster actuator 46 is shown in more detail in FIGS. 2 and 3 and has a main body portion 68 which is substantially planar. One end of the main body portion 68 defines a pawl 70. A first leg 72 substantially perpendicular to the main body portion 68 is integral with the other end thereof. The first leg 72 is positioned in an aperture 74 in the first brake shoe 14, and has a curved portion 76 by which the adjuster actuator 46 can pivot relative to the first brake shoe 14. A second leg 78, positioned approximately mid-way between the two ends of the main body portion 68 and integral therewith, extends substantially perpendicularly away from the main body portion in the opposite direction to the first leg 72. The actuator spring 44 extends between the second leg 78 and a suitable mounting point, preferably on the second brake shoe 16, to bias the pawl 70 into engagement with one of the ratchet teeth 64 on the screw-threaded rod 40.

In the non-actuated position of the hydraulic actuator 18, as shown in FIG. 1, a clearance value X exists between the friction lining material 34,36 and the drum 12. On actuation of the drum brake 10 by the vehicle operator, the pistons 22,24 of the hydraulic actuator 18 move the brake shoes 14,16 (which pivot about their other ends 30,32 respectively) to bring the friction lining material 34,36 into frictional engagement with the drum 12. As the brake shoes 14,16 move relative to each other, the adjuster actuator 46 pivots about its curved portion 76 relative to the first brake shoe 14, and the pawl 70 (because of its engagement with one of the ratchet teeth 64) rotates the screw-threaded rod 40 relative to the nut 42 in a first direction to increase the overall length of the combination of screw-threaded rod 40, nut 42, and socket member 62. Where the clearance value X is below a predetermined maximum prior to actuation, the pawl 70 remains in contact with one of the ratchet teeth 64 during actuation of the hydraulic actuator 18, and on de-actuation, the relative movements which occur on actuation are reversed, and the brake shoes 14,16 return to their previous position relative to the drum 12. Where the clearance value X exceeds the predetermined maximum prior to actuation, the pawl 70 moves into contact with the next adjacent ratchet tooth on actuation of the hydraulic actuator 18. In this case, on de-actuation of the hydraulic actuator 18, the pawl remains in contact with the said adjacent ratchet tooth restricting or preventing rotation of the screw-threaded rod 40 relative to the nut 42 in a direction opposite to the first direction, thereby retaining the increase in the overall length of the combination of screw-threaded rod 40, nut 42 and socket member 62. This results in the brake shoes 14,16 returning to a position closer to the drum 12 whereby the clearance value X is reduced below the predetermined maximum. This arrangement, as thus far described, provides for automatic wear adjustment for the drum brake 10.

Figure 4:
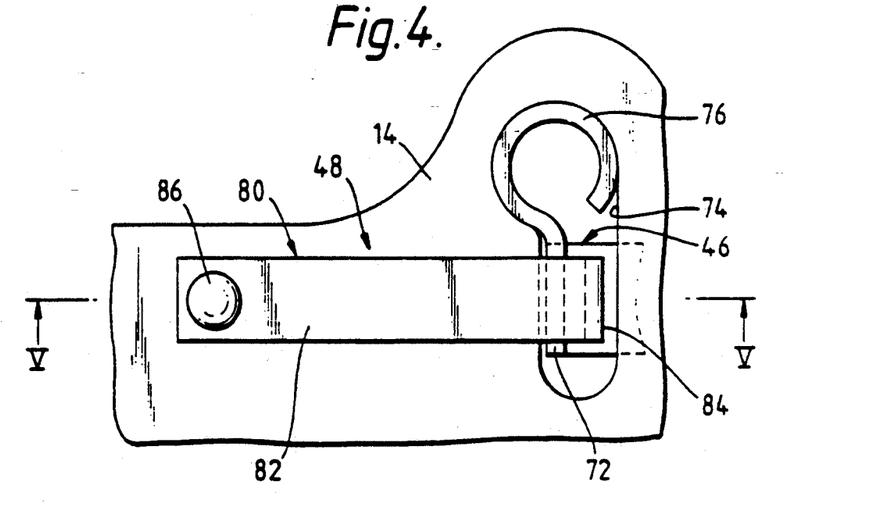
FIG. 4 is a bottom view of the heat sensitive member and adjuster actuator of the wear adjuster of the drum brake shown in FIG. 1 when the temperature is below a predetermined level.
Figure 5:
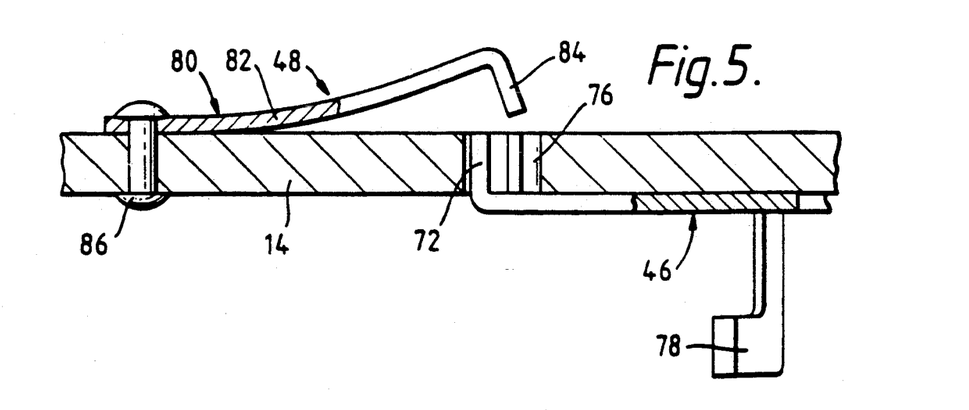
FIG. 5 is a cross-section on the line V—V of FIG. 4.
Figure 6:
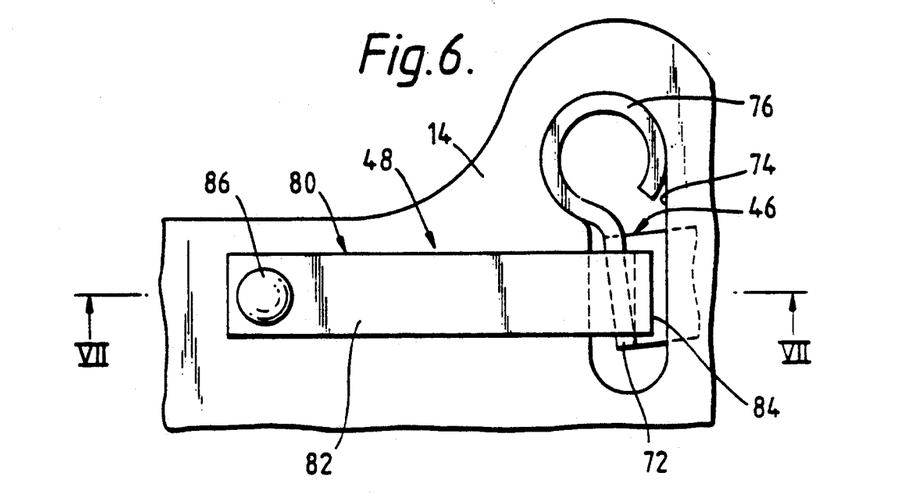
FIG. 6 is a bottom view of the heat sensitive member and adjuster actuator of the wear adjuster of the drum brake shown in FIG. 1 when the temperature is above the predetermined level.
Figure 7:
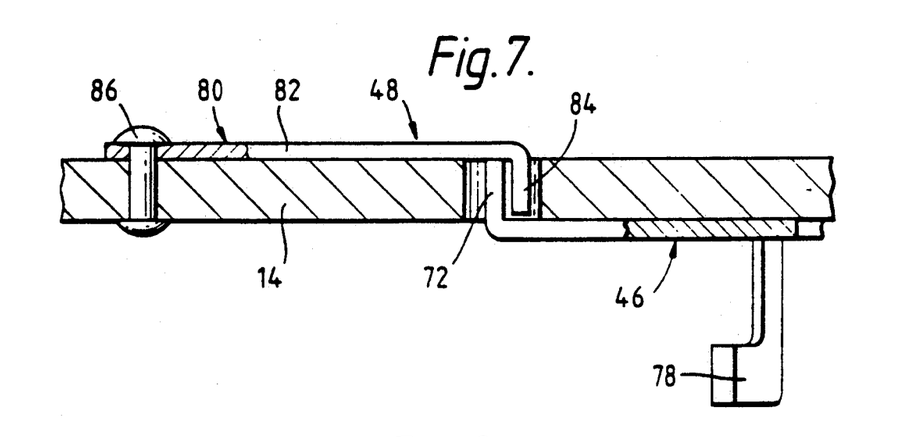
FIG. 7 is a cross-section on the line VII—VII of FIG. 6.
Figure 8:
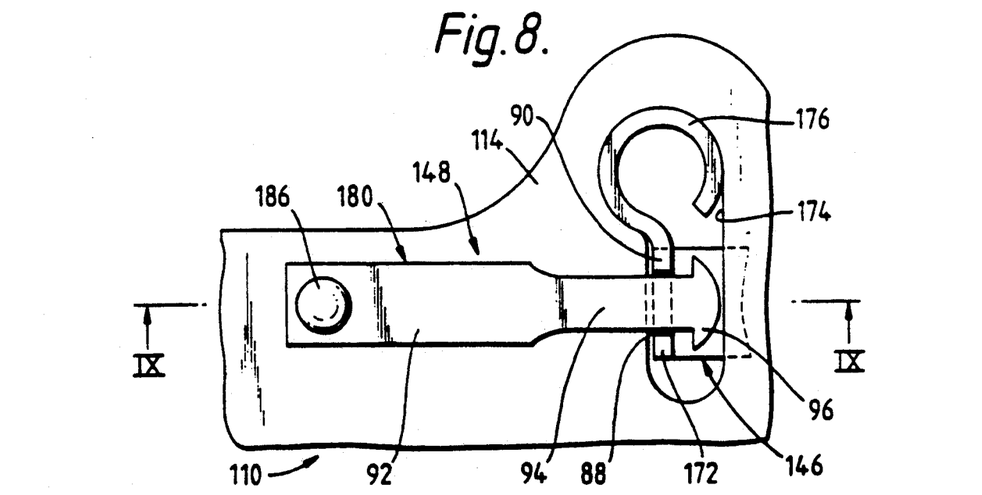
FIG. 8 is a similar view to that of FIG. 4 in which a heat sensitive member and adjuster actuator of a second embodiment of the present invention is shown.
Figure 9:
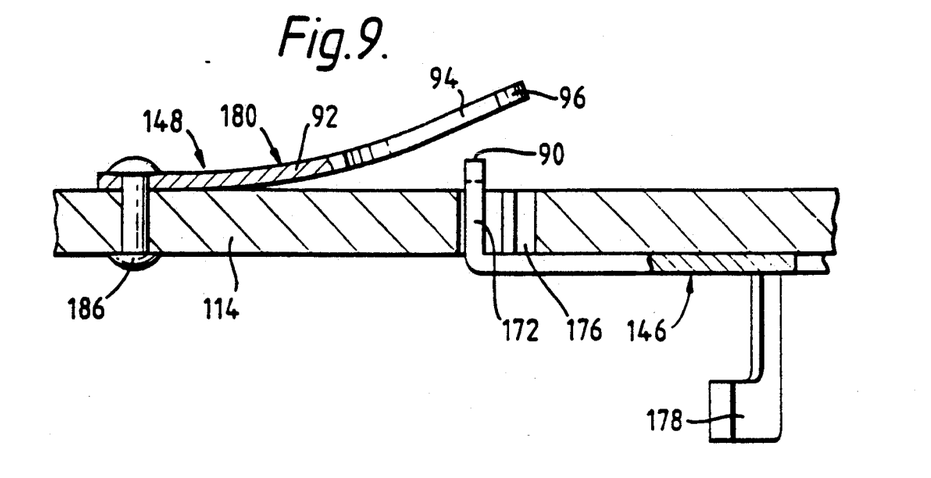
FIG. 9 is a cross-section on the line IX—IX of FIG. 8.
Figure 10:
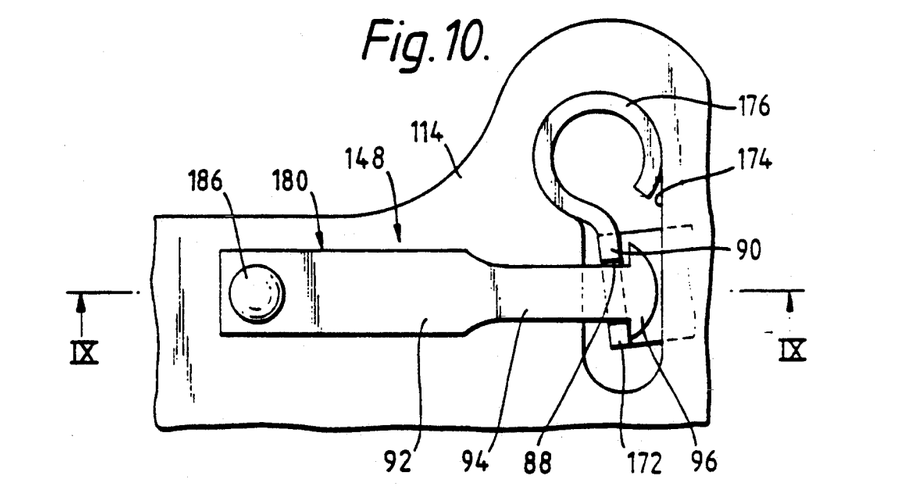
FIG. 10 is a similar view to that of FIG. 6 in which the heat sensitive member and adjuster actuator of the second embodiment of FIGS. 8 and 9 is shown.
Figure 11:
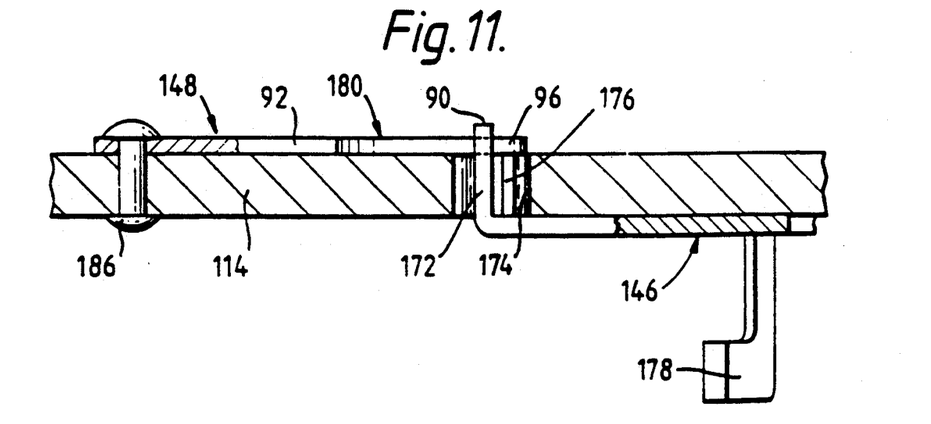
FIG. 11 is a cross-section on the line XI—XI of FIG. 10.
Figure 12:
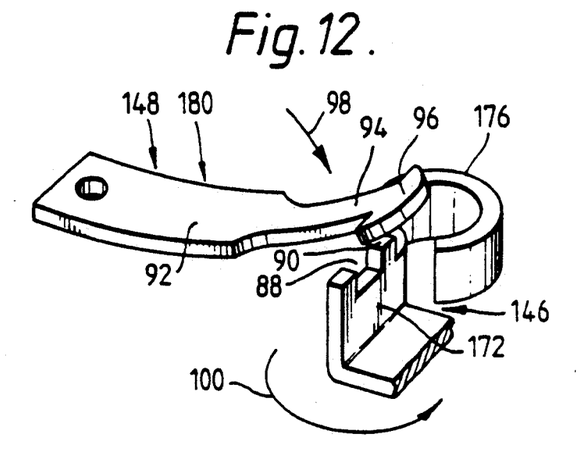
FIG. 12 is a perspective view of the heat sensitive member and adjuster actuator of FIGS. 8 to 11 showing the relative movement thereof on temperature increase and brake actuation.
Figure 13:
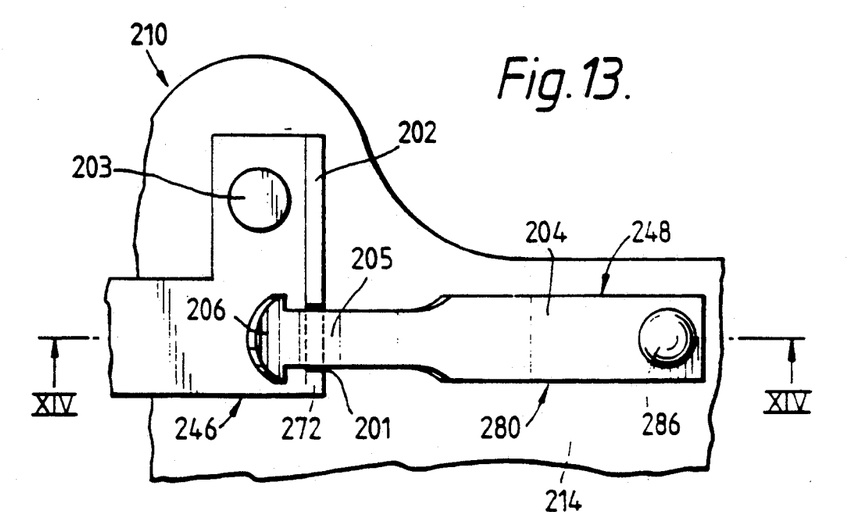
FIG. 13 is a similar view to that of FIG. 4 in which a heat sensitive member and adjuster actuator of a third embodiment of the present invention is shown.
Figure 14:
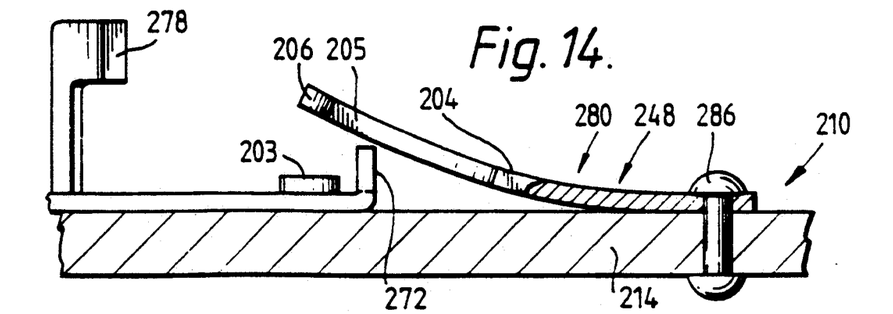
FIG. 14 is a cross-section on the line XIV—XIV of FIG. 13.

The heat sensitive member 48 is defined by a bi-metallic element 80 which is substantially L-shaped in cross-section, as shown in greater detail in FIGS. 4 and 5, to define a longer arm 82 and an integrally joined shorter arm 84. The longer arm 82 of the bi-metallic element 80 is secured (by way of a rivet 86) to the first brake shoe 14 on the opposite side thereof to the adjuster actuator 46, and normally bends away from the first brake shoe such that the shorter arm 84 is clear of the first brake shoe. As the temperature rises (for example, during prolonged braking), the longer arm 82 begins to straighten out. When the temperature exceeds a predetermined level, preferably between 70 and 40 degrees Centigrade, the shorter arm 84 moves into the aperture 74 in the first brake shoe 14 (see FIGS. 6 and 7) and engages the first leg 72 of the adjuster actuator 46. This engagement of the shorter arm 84 with the first leg 72 substantially prevents or restricts the pivotal movement of the adjuster actuator 46 relative to the first brake shoe 14, thereby holds the pawl 70 in engagement with one of the ratchet teeth 64, and thereby prevents (further) relative movement between the screw-threaded rod 40 and the nut 42 in the first direction to prevent the overall length of the screw-threaded rod, nut, and socket member 62 from increasing or increasing further.

In use, as the temperature rises, the various elements of the drum brake 10 expand, and the clearance value X increases due to this expansion. Without the above described heat sensitive element 48, the wear adjuster 20 would operate to compensate for this misleading value of the clearance, and on cooling would leave the friction lining material 34,36 in engagement with the drum 12, even when the hydraulic actuator 18 is in its non-actuated position. The heat sensitive element 48 prevents operation of the wear adjuster 20 when the temperature exceeds the predetermined level.

The arrangement in the present invention has been found to be more sensitive to temperature variations than previously known designs. Further, the arrangement by which the adjuster actuator is prevented from pivoting, and hence the pawl is held in engagement with one of the ratchet teeth, prevents unintentional rotation of the screw-threaded rod relative to the nut, thereby preventing accidental adjustment of the clearance value X when the temperature rises above the predetermined level.

A second embodiment of the present invention is partially shown in FIGS. 8 to 12, with the remaining features being substantially as shown in FIGS. 1 to 7. In this second embodiment, when compared to the first embodiment, like parts have been given the prefix 100. Referring to FIGS. 8 to 12, the first leg 172 of the adjuster actuator 146 extends through the aperture 174 to project beyond the surface of the first brake shoe 114 on the same side as the heat sensitive element 148. In this case, the first leg 172 has a notch 88 cut in its projecting edge 90. The heat sensitive member 148 is a bi-metallic element 180 and comprises a single arm 92 which is secured at one end, by rivet 186, to the first brake shoe 114, and which curves away from the first brake shoe when the temperature is below the predetermined level (see FIG. 9). The free end of the arm 92 has a neck portion 94 and an enlarged head portion 96. As the temperature rises, the arm 92 straightens, and once the temperature exceeds the predetermined level, the neck portion 94 enters the notch 88 in the first leg 172 (FIGS. 10 and 11) bringing the head portion 96 more adjacent to the first brake shoe 114. Pivoting movement of the adjuster actuator 146 relative to the first brake shoe 114 is then prevented or restricted by the first leg 172 engaging the enlarged head portion 96 of the bi-metallic element 180. Other features and operation of this third embodiment are substantially the same as with the first embodiment of FIGS. 1 to 7. The direction of movement of the bi-metallic element 180 as the temperature rises is indicated by the arrow 98 in FIG. 12. The direction of movement of the adjuster actuator 146 as the drum brake 110 is actuated is indicated by the arrow 100 in FIG. 12.

Figure 15:
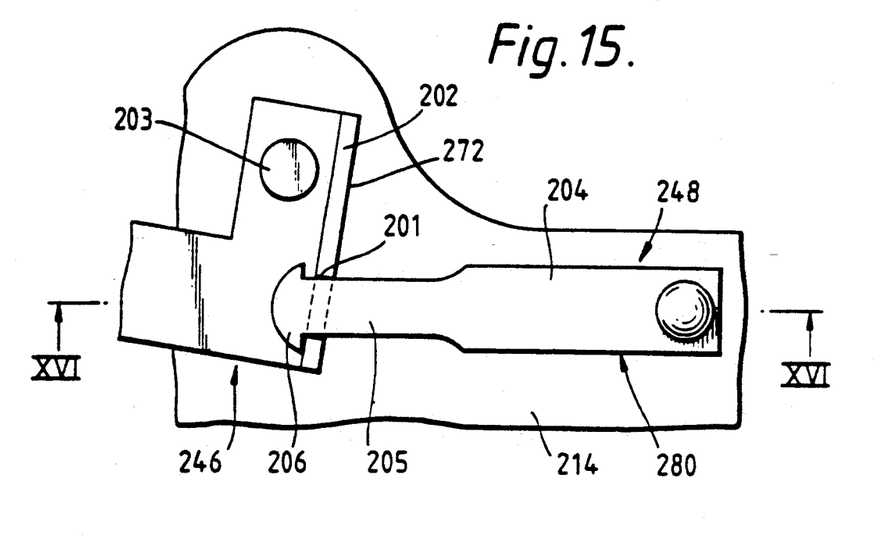
FIG. 15 is a similar view to that of FIG. 6 in which the heat sensitive member and adjuster actuator of the third embodiment of FIGS. 13 and 14 is shown.
Figure 16:
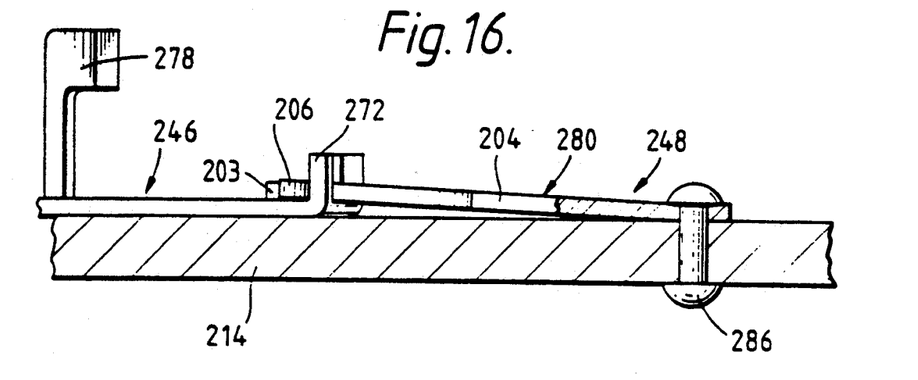
FIG. 16 is a cross-section on the line XVI—XVI of FIG. 15.
Figure 17:
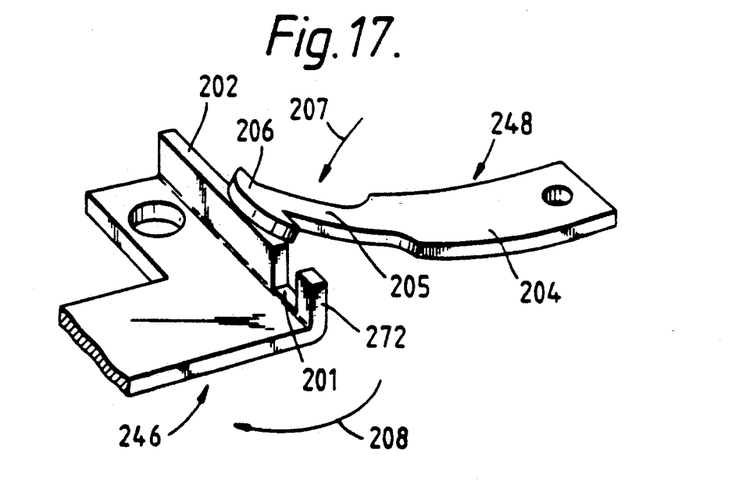
FIG. 17 is a perspective view of the heat sensitive member and adjuster actuator of FIGS. 13 to 16 showing the relative movement thereof on temperature increase and brake actuation.

A third embodiment of the present invention is partially shown in FIGS. 13 to 17, with the remaining features being substantially as shown in FIGS. 1 to 7. In this third embodiment, when compared to the first embodiment, like parts have been given the prefix 200. Referring to FIGS. 13 to 17, the first leg 272 of the adjuster actuator 246 extends in substantially the same direction as the second leg 278, and has a notch 201 cut in its free edge 202. The adjuster actuator 246 is pivotally mounted on the first brake shoe 214 by way of a rivet 203. The heat sensitive member 248 comprises a bi-metallic element 280 which is positioned on the same side of the first brake shoe 214 as the adjuster actuator 246. The bi-metallic element 280 comprises a single arm 204 which is secured at one end, by rivet 286, to the first brake shoe 214, and which curves away from the first brake shoe when the temperature is below the predetermined level (see FIG. 14). The free end of the arm 204 has a neck portion 205 and an enlarged head portion 206. As the temperature rises, the arm 204 straightens, and once the temperature exceeds the predetermined level, the neck portion 205 enters the notch 201 in the first leg 272 (FIGS. 15 and 16). Pivoting movement of the adjuster actuator 246 relative to the first brake shoe 214 is then prevented or restricted by the first leg 272 engaging the enlarged head portion 206 of the bi-metallic element 280. Other features and operation of this third embodiment are substantially the same as with the first embodiment of FIGS. 1 to 7. The direction of movement of the bi-metallic element 280 as the temperature rises is indicated by the arrow 207 in FIG. 17. The direction of movement of the adjuster actuator 246 as the drum brake 210 is actuated is indicated by the arrow 208 in FIG. 17.

Figure 18:
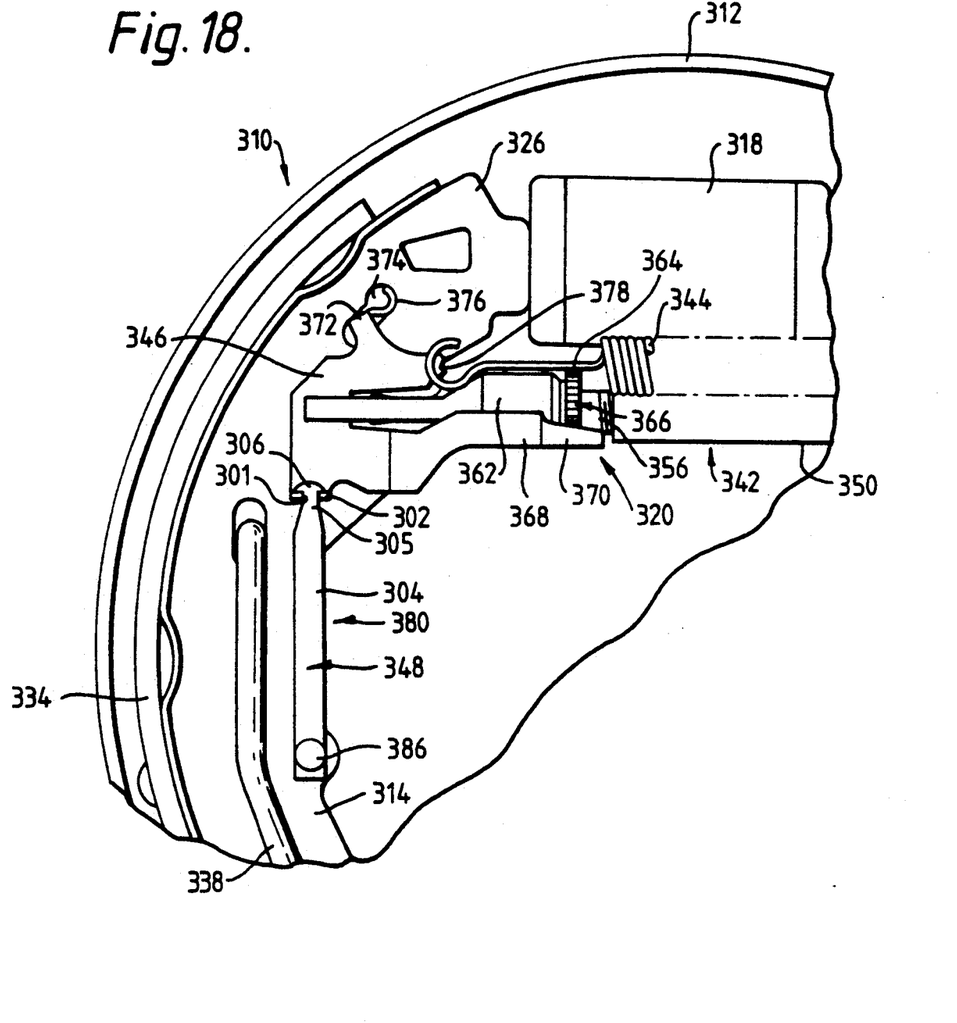
FIG. 18 is a view, partly cut-away, similar to that of FIG. 1, of a fourth embodiment of the present invention.

In the fourth embodiment 310 shown in FIG. 18, in comparison to FIG. 1, the curved portion 376 of the adjuster actuator 348 is positioned in an aperture 374 in the first brake shoe 314 on one side of the socket member 362, and the heat sensitive member 348 engages the adjuster actuator 348 on the other side of the socket member. Also, the pawl 370 is positioned on said other side of the socket member 362. In this arrangement, the heat sensitive member 348 is substantially the same as, and operates in substantially the same way as, the heat sensitive member 248 of FIGS. 13 to 17. Consequently, like parts (in comparison to FIGS. 1 and 13 to 17) have been given the designation "300".

Figure 19:
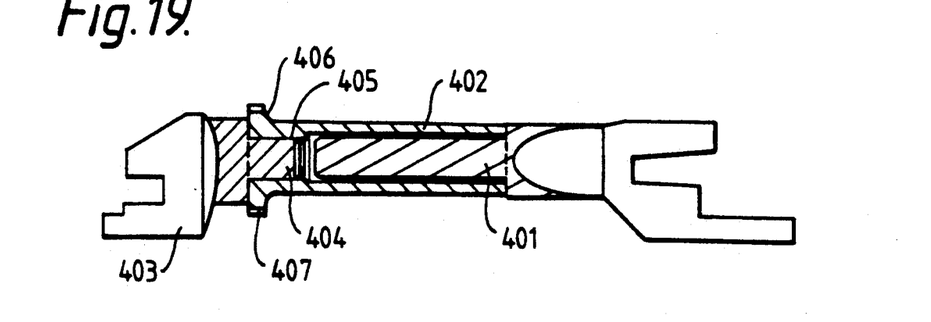
FIG. 19 is a view, partly in cross-section of an alternative form of some of the components of a wear adjuster for use with any of the described embodiments.

FIG. 19 shows an alternative form of part of the wear adjuster of any of the above described embodiments. In comparison to FIG. 1A, the tube 50 has been replaced by an externally threaded rod 401; the screw-threaded rod 40 has been replaced by an internally threaded tube 402; and the socket member 62 replaced by a pin member 403. The pin member 403 has an end 404 which is freely rotatable in the bore 405 of the tube 402. The pin member 403 engages an enlarged diameter portion 406 of the tube 402 on which ratchet teeth 407 are formed. The rod 401 and tube 402 threadingly engage one another. The operation of this form of wear adjuster is substantially the same as the wear adjuster 20 described above.

Various other modifications may be made to the above embodiments without departing from the scope of the present invention. For example, the single hydraulic actuator may be replaced by two hydraulic actuators, one for each brake shoe. Also, by suitable rearrangement of the elements of the wear adjuster, the heat sensitive member may be pivotally mounted on the second brake shoe. Further, the internally threaded tube may be replaced by a tube having a clear internal surface within which the screw-threaded rod can freely rotate, the nut being defined by a separate element which engages the free end of the tube. In this case, the ratchet teeth may be formed in the peripheral edge of the nut, and the socket member may be omitted, with the screw-threaded rod directly engaging the first brake shoe. Further still, the heat sensitive member could be defined by an element made of SME material. Whilst the heat sensitive members herein described are either substantially L-shaped, or substantially planar with an enlarged head, other suitable shapes may also be used.

The embodiments of the invention in which an exclusive property or privilege is claimed are defined as follows:

1. A drum brake comprising a drum; first and second brake shoes which are pivotally mounted at one end thereof and which carry friction lining material; at least one hydraulic actuator engaging the other end of the brake shoes for moving the friction lining material into contact with the drum on actuation thereof, a clearance existing between the friction lining material and the drum in the non-actuated position of the hydraulic actuator; a wear adjuster for adjusting the value of the clearance, the wear adjuster comprising a screw-threaded rod engaging the first brake shoe, a nut rotatably threaded on the screw-threaded rod and engaging the second brake shoe, a ratchet teeth integrally formed on either the screw-threaded rod or the nut, an adjuster actuator having an integral pawl thereon and being pivotally mounted on one of the brake shoes, an actuator spring attached to the adjuster actuator to bias the pawl into contact with the ratchet teeth to rotate the nut relative to the screw-threaded rod in opposite directions on actuation and de-actuation respectively of the hydraulic actuator when the clearance value is below a predetermined maximum prior to actuation, but to prevent or restrict relative rotation on de-actuation of the hydraulic actuator when the clearance value is above the predetermined maximum prior to actuation to return the clearance value to below the predetermined maximum; and a heat sensitive member mounted on said one brake shoe, the heat sensitive member being engageable with the adjuster actuator only when the temperature exceeds a predetermined level to substantially prevent or restrict pivoting of the adjuster actuator, thereby rotating the nut relative to the screw-threaded rod in opposite directions on actuation and de-actuation respectively of the hydraulic actuator, irrespective of the clearance value prior to actuation, and wherein the adjuster actuator comprises a first leg which extends into an aperture in the said one brake shoe from one side of the said one brake shoe; and wherein the heat sensitive member is positioned on the opposite side of the said one brake shoe to the adjuster actuator and comprises a long arm and an integrally joined short arm, the long arm being curved when the temperature is below the predetermined level and substantially straight when the temperature is above the predetermined level, the arrangement being such that the short arm moves into the aperture when the temperature is above the predetermined level to engage the first leg, thereby substantially preventing or restricting pivotal movement of the adjuster actuator relative to the said one brake shoe.

2. A drum brake as claimed in claim 1 wherein the first leg has a curved portion positioned in the aperture about which the adjuster actuator can pivot relative to the said one brake shoe.

3. A drum brake as claimed in claim 1 wherein the adjuster actuator comprises a main body portion which is substantially planar, the pawl being positioned at one end thereof and the first leg extending away from the other end thereof at substantially 90 degrees thereto.

4. A drum brake as claimed in claim 3, wherein the adjuster actuator comprises a second leg positioned substantially mid-way between the pawl and the first leg and extending away from the main body portion at substantially 90 degrees thereto, the actuator spring being secured at one end to the second leg.

5. A drum brake as claimed in claim 4, wherein the other end of the actuator spring is secured to the other brake shoe.

6. A drum brake as claimed in claim 1 wherein the adjuster actuator is mounted on the first brake shoe.

7. A drum brake as claimed in claim 1 comprising a single hydraulic actuator having two pistons, one piston acting on the first brake shoe, and the other piston acting on the second brake shoe.

8. A drum brake as claimed in claim 1 wherein the nut comprises an internally threaded tube which is open at one end and closed at the other end, the screw-threaded rod being screw threaded into the open end of the tube, and the closed end engaging the second brake shoe; and wherein the ratchet teeth are formed around the peripheral edge of an enlarged portion of the screw-threaded rod.

9. A drum brake as claimed in claim 1 wherein a tube is positioned between the nut and the second brake shoe, the nut being rotatable relative to the tube, the screw-threaded rod extending into the tube and being freely rotatable therein; and wherein the ratchet teeth are formed around the peripheral edge of the nut.

10. A drum brake as claimed in claim 1 wherein the heat sensitive member is a bi-metallic element.

11. A drum brake comprising a drum; first and second brake shoes which are pivotally mounted at one end thereof and which carry friction lining material; at least one hydraulic actuator engaging the other end of the brake shoes for moving the friction lining material into contact with the drum on actuation thereof, a clearance existing between the friction lining material and the drum in the non-actuated position of the hydraulic actuator; a wear adjuster for adjusting the value of the clearance, the wear adjuster comprising a screw-threaded rod engaging the first brake shoe, a nut rotatably threaded on the screw-threaded rod and engaging the second brake shoe, ratchet teeth integrally formed on either the screw-threaded rod or the nut, an adjuster actuator having an integral pawl thereon and being pivotally mounted on one of the brake shoes, an actuator spring attached to the adjuster actuator to bias the pawl into contact with the ratchet teeth to rotate the nut relative to the screw-threaded rod in opposite directions on actuation and de-actuation respectively of the hydraulic actuator when the clearance value is below a predetermined maximum prior to actuation, but to prevent or restrict relative rotation on de-actuation of the hydraulic actuator when the clearance value is above the predetermined maximum prior to actuation to return the clearance value to below the predetermined maximum; and a heat sensitive member mounted on said one brake shoe, the heat sensitive member being engageable with the adjuster actuator only when the temperature exceeds a predetermined level to substantially prevent or restrict pivoting of the adjuster actuator, thereby rotating the nut relative to the screw-threaded rod in opposite directions on actuation and de-actuation respectively of the hydraulic actuator, irrespective of the clearance value prior to actuation, and wherein the adjuster actuator comprises a first leg which extends through an aperture in the said one brake shoe from one side of the said one brake shoe, the first leg having a notch in its projecting edge; and wherein the heat sensitive member is positioned on the opposite side of the said one brake shoe to the adjuster actuator and comprises an arm having a neck portion and an enlarged head portion at one end, the arm being curved when the temperature is below the predetermined level and substantially straight with the head end more adjacent to the brake shoe when the temperature is above the predetermined level, the arrangement being such that the neck portion moves into the notch when the temperature is above the predetermined level such that the first leg engages the enlarged head portion, thereby substantially preventing or restricting pivotal movement of the adjuster actuator relative to the said one brake shoe.

12. A drum brake comprising a drum; first and second brake shoes which are pivotally mounted at one end thereof and which carry friction lining material; at least one hydraulic actuator engaging the other end of the brake shoes for moving the friction lining material into contact with the drum on actuation thereof, a clearance existing between the friction lining material and the drum in the non-actuated position of the hydraulic actuator; a wear adjuster for adjusting the value of the clearance, the wear adjuster comprising a screw-threaded rod engaging the first brake shoe, a nut rotatably threaded on the screw-threaded rod and engaging the second brake shoe, ratchet teeth integrally formed on either the screw-threaded rod or the nut, an adjuster actuator having an integral pawl thereon and being pivotally mounted on one of the brake shoes, an actuator spring attached to the adjuster actuator to bias the pawl into contact with the ratchet teeth to rotate the nut relative to the screw-threaded rod in opposite directions on actuation and de-actuation respectively of the hydraulic actuator when the clearance value is below a predetermined maximum prior to actuation, but to prevent or restrict relative rotation on de-actuation of the hydraulic actuator when the clearance value is above the predetermined maximum prior to actuation to return the clearance value to below the predetermined maximum; and a heat sensitive member mounted on said one brake shoe, the heat sensitive member being engageable with the adjuster actuator only when the temperature exceeds a predetermined level to substantially, prevent or restrict pivoting of the adjuster actuator, thereby rotating the nut relative to the screw-threaded rod in opposite directions on actuation and de-actuation respectively of the hydraulic actuator, irrespective of the clearance value prior to actuation, and wherein the adjuster actuator comprises a first leg which extends substantially perpendicularly from one side of the said one brake shoe, the first leg having a notch in its projecting edge; and wherein the heat sensitive member is positioned on the same side of the said one brake shoe as the adjuster actuator and comprises an arm having a neck portion and an enlarged head portion at one end, the arm being curved when the temperature is below the predetermined level and substantially straight with the head more adjacent to the brake shoe when the temperature is above the predetermined level, the arrangement being such that the neck portion moves into the notch when the temperature is above the predetermined level such that the first leg engages the enlarged head portion, thereby substantially preventing or restricting pivotal movement of the adjuster actuator relative to the said one brake shoe.

* * * * *